Patented Nov. 26, 1929

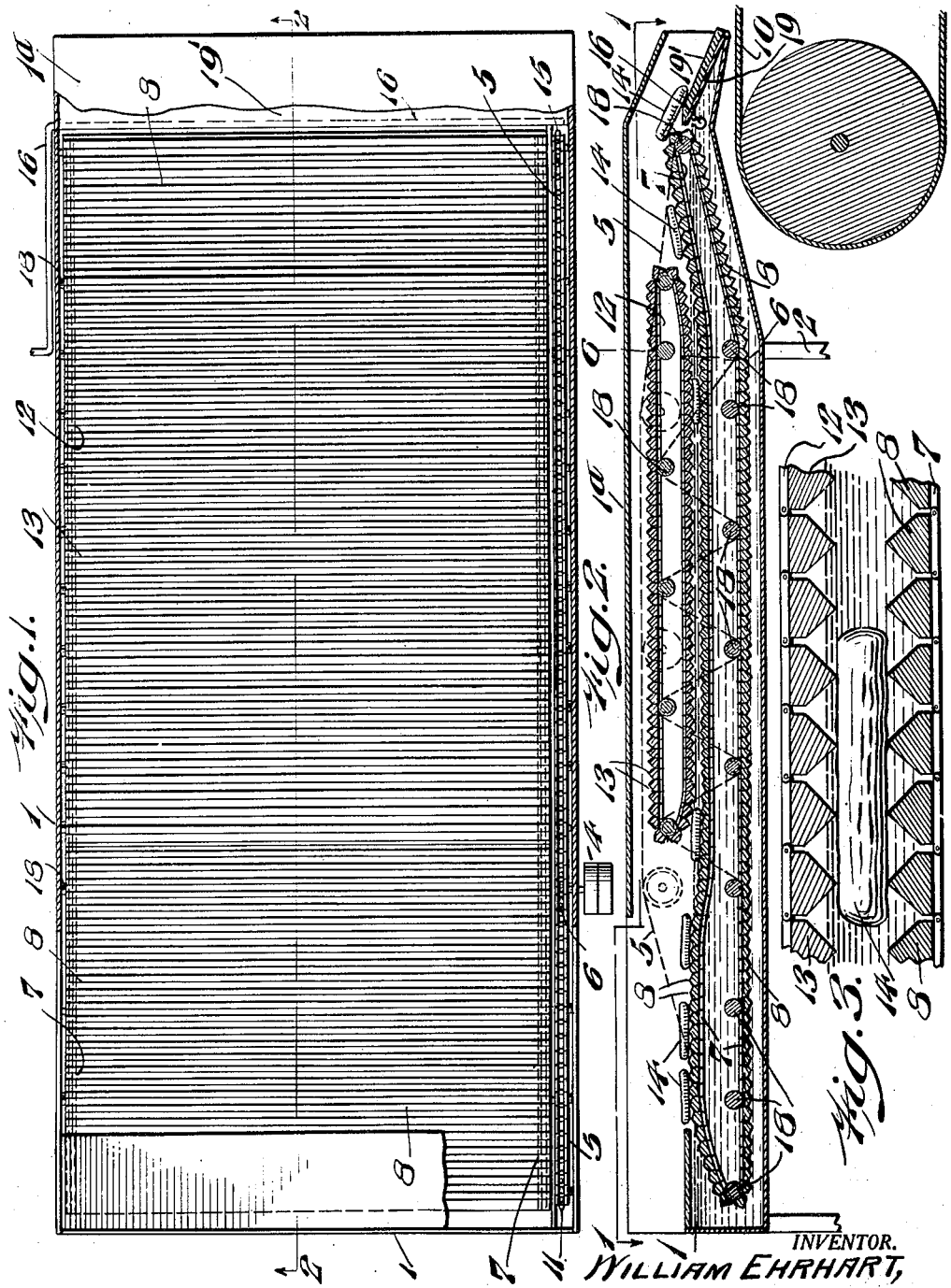

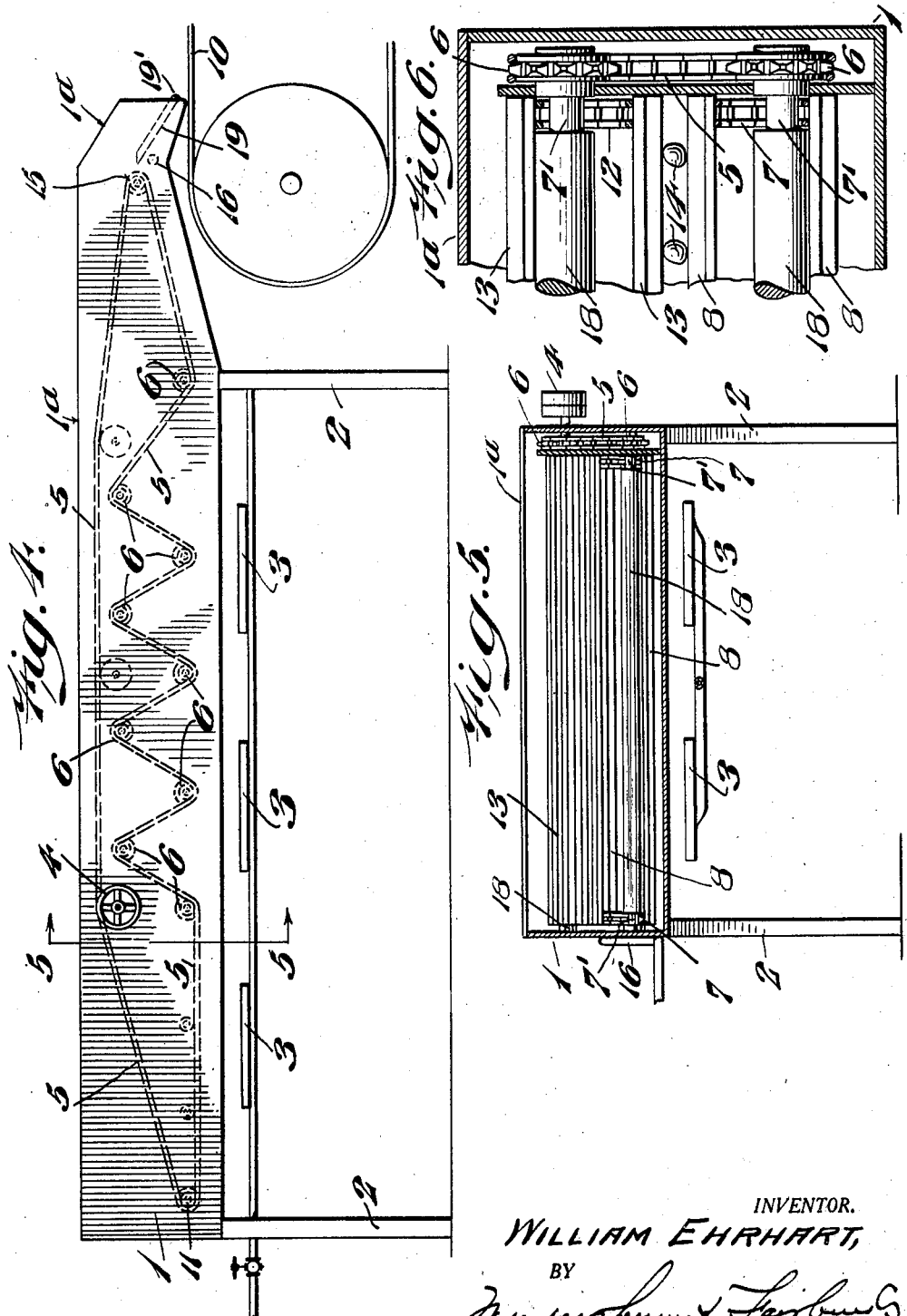

1,737,363

UNITED STATES PATENT OFFICE

WILLIAM EHRHART, OF LANCASTER, PENNSYLVANIA

DOUGH-COOKING APPARATUS

Application filed June 8, 1928. Serial No. 283,820.

This invention, stated in general terms, relates to dough cooking apparatus and has more especial relation to apparatus in which the dough is fed horizontally through the cooking solution.

The leading object of the present invention is to provide dough cooking apparatus in which the pieces of dough are first deposited upon an endless conveyor and subsequently submerged and held in submerged position by a second endless conveyor during a cooking period, and in which the cooked pieces of dough are finally elevated from the cooking solution and delivered to a conveyor.

A further object of the present invention is to provide apparatus of the character stated in which by the submersion of pieces of dough within the cooking solution, as sal soda and water, the pores of the dough during a cooking period are effectively sealed.

A further object of the present invention is to provide a pair of endless conveyors as indicated in the foregoing objects, which conveyors are each provided with a plurality of strips which will float so that in the feeding of the dough the endless conveyor at certain periods floats upon the cooking solution and at other periods is submerged in the cooking solution and carries with it the articles to be cooked so that the articles themselves are submerged in the cooking solution.

A further object of the present invention resides in the provision of general details of construction and arrangement and combination of parts for attaining the results sought in the foregoing objects.

With these and other objects in view, the invention consists of the novel construction hereinafter described and finally claimed.

The nature, characteristic features and scope of the invention will be more fully understood from the following description taken in connection with the accompanying drawings forming part hereof, and in which:

Fig. 1 is a view taken upon the line 1—1 of Fig. 2.

Fig. 2, is a view taken upon the line 2—2 of Fig. 1.

Fig. 3, is a fragmentary view in horizontal section taken approximately at the central part of Fig. 2.

Fig. 4, is a view in side elevation of parts shown in Figs. 1 and 2.

Fig. 5, is a view in cross section taken upon the line 5—5 of Fig. 4.

Fig. 6, is a view in cross section taken upon the line 6—6 of Fig. 2.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring now to the drawings in detail, the reference numeral 1 represents a casing or housing supported by standards 2, and adapted to contain a cooking solution, for example sal soda and water, and provided with a cover 1ª. This cooking solution may be heated in any desired manner by means of gas burners 3, oil burners, electrical apparatus, or any other desired heating appliances which form no part of the present invention. The reference numeral 4 designates a pulley for driving a sprocket chain 5 which is arranged at one side of the casing or housing 1, which sprocket chain is adapted to travel in a circuitous manner over the plurality of sprockets 6. The purpose of these sprockets is to drive the shafts 18 hereinafter referred to. The endless chain 7 is provided throughout its extent with outwardly extended blocks of material 8 which will float in liquid, as for instance, the previously described solution of sal soda and water. While in practice blocks of wood 8 have been formed to give excellent results, nevertheless other material such as cork or the like may be substituted for wood. The blocks 8 in cross section are of pointed configuration, as best seen in Fig. 3. The chain 7 which carries the blocks 8 has frictional engagement with the annular grooved portion 7' of the shafts 18. The shafts 18 are each provided with a sprocket wheel 6, see Fig. 4, driven by sprocket chain 5, through the instrumentality of the driving wheels 4. The lower series of shafts 18, as clearly shown in Fig. 2, serve to maintain the chain 7 in horizontal position during its travel through the cooker, and the upper series of shafts 18 serve to maintain chain 12 in horizontal position throughout its travel with respect to the cooker. At that end of the housing or casing 1 in which the pieces of dough are introduced for cooking purposes, the endless band of blocks 8 as carried by chains 7 is free to float in the cooking solution as is clearly shown in Fig. 2. This arrangement of parts is shown at the left hand side of Fig. 2. At the right hand side of Fig. 2, which is the delivery portion of the apparatus, the endless chain of pointed wooden blocks is caused to emerge from the cooking solution, and intermediate the feeding and delivery portions thus recited the endless chain of pointed blocks is kept submerged within the cooking solution by apparatus to be presently described. In other words, after delivery of a cooked piece of dough 9 to conveyor 10 the endless chain of wooden strips is caused to travel to the left in Fig. 2 absolutely submerged in the cooking solution by reason of the fact that the endless conveyor travels beneath the shafts 18.

The reference numeral 12 designates a chain adapted to be driven by apparatus similar to that hereinbefore described with respect to chains 7, as clearly shown in Fig. 2. This chain 12 from end to end is provided with a series of pointed blocks 13, similar in all respects to those carried by the chain 7. These pointed blocks in the travel of the chains 7 and 12 face one another during travel of pieces of dough to be cooked. This position of parts is clearly shown in Fig. 2.

In operation pieces of uncooked dough. as indicated at 14, in Fig. 2, are deposited upon the blocks 8, upon chain 7, it being understood in the connection that the conveyor at this point is floating upon the top of the solution within the casing or housing 1. During the travel of the chain 7 and its blocks 8 toward the right in Fig. 2, the pieces of dough 14 impinge against the underside of the blocks 13 carried by the chain 12. This position of parts is clearly shown at the center part of Fig. 2. This causes the chain 7 and its blocks 8, together with the uncooked dough, to be submerged within the cooking solution, and as the two chains travel in parallelism with the blocks 8 in opposed relation the dough is caused to be totally submerged for cooking purposes, as is clearly shown in Fig. 3. With the dough properly cooked the chain 7 has reached the delivery part of the device and is caused to rise at an inclination by reason of the sprocket 15, thus ejecting a cooked piece of dough to the endless band 10. An overflow pipe leads from the housing or casing 1 so that the cooking solution will always be maintained at a predetermined level. The purpose of the cover 1ª is to maintain heat within the cooking apparatus, and it is extended and inclined in the form of a nozzle 19 to direct steam over dough as ejected to prevent scorching thereof and keep the inclined plate 19' moist. The moist condition of the plate 19' prevents sticking of the dough while passing from the apparatus and further prevents burning of the dough. The plate 19' is of wood arranged to absorb and retain moisture longer than would a metallic facing. The wooden plate will not develop the same amount of heat as a metallic facing, thus safeguarding against the scorching and burning of the dough. The delivery end of the apparatus, that is the nozzle 19, forms a part which is filled with a solution below the boiling point, that is, at a temperature of about 200 degrees; whereas the temperature of the solution in the oven is over 400 degrees.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new, and desire to secure by Letters Patent, is:

1. In dough cooking apparatus, a housing containing a cooking solution; a horizontally arranged floatable endless conveyor operative for movement therethrough, arranged to float to the surface of the cooking solution during a portion of its travel and to be immersed during another portion of its travel, the upper run of which conveyor in its travel is loose and free to float in said cooking solution, and means for temporarily repelling said floating action and for immersing said upper run at predetermined periods.

2. In dough cooking apparatus, a housing containing a cooking solution, a horizontally arranged floatable endless conveyor operative for movement therethrough, arranged to float to the surface of the cooking solution during a portion of its travel and to be immersed during another portion of its travel, the upper run of which conveyor in its travel is loose and free to float in said cooking solution, and means including an endless belt for temporarily repelling said floating action and for immersing said upper run at predetermined periods.

3. In dough cooking apparatus, a housing containing a cooking solution, a horizontally arranged floatable endless conveyor operative for movement therethrough, arranged to float to the surface of the cooking solution during a portion of its travel and to be immersed during another portion of its travel, the upper run of which conveyor in its travel is loose and free to float in said cooking solution, means for temporarily repelling said floating action and for immersing said upper run at predetermined periods, and means for raising the delivery end of said conveyor free of said cooking solution.

4. In dough cooking apparatus, a housing containing a cooking solution, means for maintaining said cooking solution at a constant level, a horizontally arranged floatable endless conveyor operative for movement through said solution, arranged to float to the surface of the cooking solution during a portion of its travel and to be immersed during another portion of its travel, the upper run of which conveyor in its travel is loose and free to float in said cooking solution, and means for temporarily repelling said floating action and for immersing said upper run at predetermined periods.

5. In dough cooking apparatus, a housing containing a cooking solution, a horizontally arranged endless conveyor including pointed blocks of buoyant material, operative for movement therethrough, the upper run of which conveyor in its travel is loose and free to float in said cooking solution, and means for temporarily repelling said floating action and for immersing said upper run at predetermined periods.

6. In dough cooking apparatus, a housing containing a cooking solution, a horizontally arranged floatable endless conveyor operative for movement therethrough, arranged to float to the surface of the cooking solution during a portion of its travel and to be immersed during another portion of its travel, the upper run of which conveyor in its travel is loose and free to float in said cooking solution, and means including a belt provided with pointed blocks of buoyant material operative for temporarily repelling said floating action and for immersing said upper run of the conveyor at predetermined periods.

7. In dough cooking apparatus, a housing containing a cooking solution, means for maintaining the level of said solution constant, a horizontally arranged conveyor provided with slats of buoyant floatable material which conveyor is operative for movement through said housing, which conveyor floats to the surface of said solution during a portion of the travel of said conveyor, the upper run of which conveyor in its travel is loose and free to float in said cooking solution, means including an endless band provided with slats of buoyant material for temporarily repelling said floating action and for immersing the upper run of said conveyor at predetermined periods, means for delivering cooked dough, and a plurality of shafts for maintaining the lower run of said endless conveyor submerged in said cooking solution at all times.

WILLIAM EHRHART.